United States Patent [19]
Aronne

[11] Patent Number: 5,036,660
[45] Date of Patent: Aug. 6, 1991

[54] DUAL ACTUATION HARNESS FITTING RELEASE

[75] Inventor: Armand J. Aronne, Massapequa, N.Y.

[73] Assignee: Grumman Aerospace Corporation, Bethpage, N.Y.

[21] Appl. No.: 482,755

[22] Filed: Feb. 21, 1990

[51] Int. Cl.$^5$ ............................................. F01K 25/10
[52] U.S. Cl. ............................................. 60/398; 60/400; 60/404; 60/651; 60/671; 137/81.2
[58] Field of Search ................ 60/651, 671, 400, 404, 60/407, 398, 632, 636; 137/81.2

[56] References Cited

U.S. PATENT DOCUMENTS

| | | | |
|---|---|---|---|
| 3,436,914 | 4/1969 | Rosfelder | 60/398 |
| 3,504,648 | 4/1970 | Kriedt | 60/398 X |
| 3,572,032 | 3/1971 | Terry | 60/398 |
| 4,185,652 | 1/1980 | Zintz et al. | 60/398 X |

Primary Examiner—Allen M. Ostragen
Attorney, Agent, or Firm—Pollock, VandeSande & Priddy

[57] ABSTRACT

Aviator harness fittings are pneutically actuated by a central device including a pressurized gas cartridge. A firing pin may mechanically pierce the cartridge or automatic ballistic actuation of the firing pin may be accomplished by SEA WARS gas-generating devices when the latter contacts sea water. The ballistic actuation of the present invention requires two separate SEA WAR gas-generating devices to fire simultaneously thereby minimizing the chance of false actuation.

9 Claims, 1 Drawing Sheet

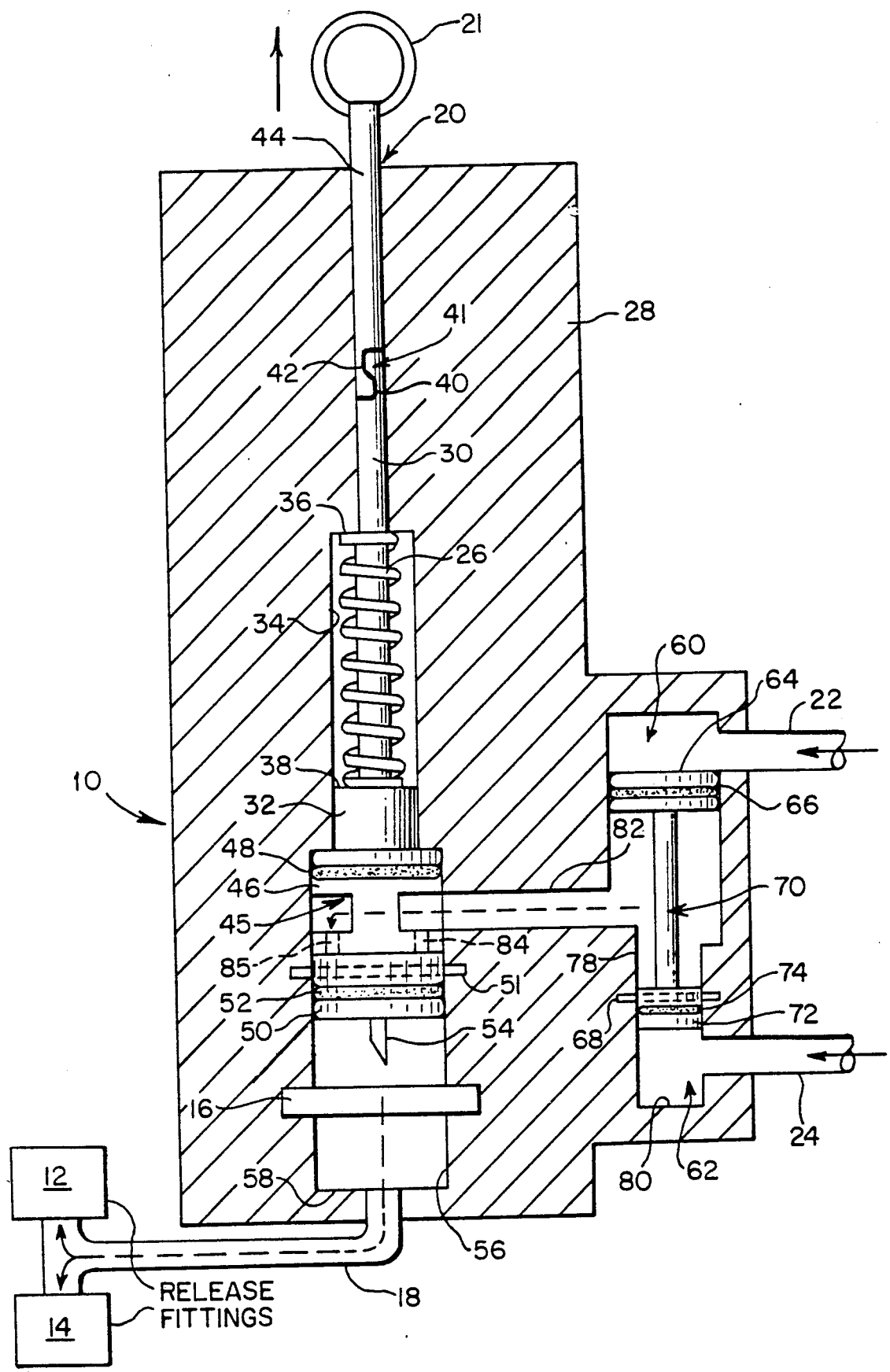

DUAL ACTUATION HARNESS FITTING RELEASE

FIELD OF THE INVENTION

The present invention is directed to release means for aviator harnesses, and more particularly to such a harness release capable of manual or automatic actuation.

BACKGROUND OF THE INVENTION

Modern combat aviators are provided with harnesses to which parachutes and survival gear are attached. After bail-out and subsequent landing, the harness must be quickly removed to minimize the chance of injury to the aviator. At times, the aviator will land on firm terrain and other times in the sea. When sea landings are involved, it is possible that harness retention will cause the aviator to become incorrectly oriented, thereby presenting the ever-present danger of drowning. This is especially true in the event that the aviator has lost consciousness and is unable to mechanically actuate the harness release mechanism.

Harness release mechanisms must satisfy two basic design criteria. First, they must securely retain the aviator in the harness during normal flight conditions. The second requirement is for quick release after a parachute landing. Many of the prior art approaches have been successful with either one or the other but not both. Further, an attempt to accommodate land and sea landings as well as automatic release in the sea tends to create an unreliable and rather cumbersome mechanism.

BRIEF DESCRIPTION OF THE INVENTION

The present invention is intended to solve the problems set forth above by packaging a quick release actuating mechanism that is capable of both manual actuation and ballistic actuation, the latter being for automatic deployment. In order to create a pneumatic charge for harness quick release connectors of the type set forth in the previously mentioned co-pending applications, it is necessary to generate a charge of compressed gas. The present invention accomplishes this by incorporating a small pressurized gas canister which is pierced by either a mechanical actuator or a ballistically driven actuator, the latter operating in an automatic mode. Once the canister is pierced, an outlet communicating therewith supplies the necessary pressurized gas for pneumatically driving harness quick release mechanisms to an open position.

The ballistic actuation (automatic) of the present invention utilizes the miniature gas generators, presently in use by aviators and known as SEA WARS devices. These latter-mentioned devices represent prior art and are therefore not discussed in great detail, per se. However, as is known by those of ordinary skill in the art, these devices sense sea water and electrolytically generate a gas charge which is used as a ballistic actuating means for piercing a pressurized canister. It is this canister, as previously mentioned, which releases a sufficient compressed gas charge which frees the harness quick release devices of the aforementioned co-pending patent application.

BRIEF DESCRIPTION OF THE FIGURE

The above-mentioned objects and advantages of the present invention will be more clearly understood when considered in conjunction with the accompanying drawing, in which:

the figure is a partial sectional view illustrating the principal components of the present invention.

DETAILED DESCRIPTION OF THE INVENTION

Referring to the figure, reference numeral 10 generally indicates the actuation device of the present invention. Its purpose is to create a compressed gas charge sufficient to actuate release fittings 12 and 14 into a free position. The release fittings 12 and 14 are not part of the present invention, per se, but do form the subject matter of the previously identified co-pending related patent application. The source of the pressurized gas is cartridge 16 which communicates with the release fittings 12 and 14 through supply pipe 18. The mechanical purpose of the present invention is to pierce the cartridge 16 when appropriate so that a compressed gas charge can be delivered to the release fittings 12 and 14. It should be mentioned that, although only two such fittings are illustrated, this is merely a simplification in number and is only exemplary. For many types of harnesses, four such fittings are actually employed.

The cartridge 16 may be pierced by either displacing an actuator rod 20, or in an automatic mode this is made possible through ballistic actuation. This occurs when the previously mentioned SEA WARS gas generators provide hot gas charges at both inlet pipes 22 and 24 which in turn operate the canister-piercing mechanism, as will be explained more fully hereinafter.

Considering the canister-piercing mechanism in greater detail, continued reference is made to the figure wherein a compressed spring 26 is seen to be located within a mechanism housing 28. Within the housing is an elongated actuator rod, generally indicated by reference numeral 20, which includes a lower section 30 around which the spring is located. The lower end of section 30 has an enlarged boss 32 located within a coaxial cylindrical cavity 34. The upper shoulder 36 of the cavity acts as a mechanical stop for the corresponding upper end of spring 26 while the confronting shoulder of boss 38 acts as a mechanical stop for the lower end of spring 26. An upper section 44 of the actuator rod 20 is coupled to the lower section 30 by means of corresponding keeper ends 40 and 42 which are coupled together by detent action. The actuator rod 20 is normally maintained so that the spring 26 assumes a non-compressed condition. For actuation, the ring 21 of rod 20 is pulled upwardly until spring 26 becomes sufficiently compressed to force disengagement of the keeper ends 40 and 42. Then, spring 26 forces boss 32 downwardly, thereby hammering against a coaxially positioned dumbbell-shaped piston member 45 to cause mechanical actuation of release fittings 12 and 14 as will be explained herinafter.

The piston member 45 includes an end 46 coaxially located within cylinder 56. An O-ring seal 48 encircles the end 46 for maintaining a gas seal during ballistic actuation. A lower end 50 of the piston 45 contains an O-ring 52 therearound for preventing escape of compressed gas from cartridge 16 beyond the piston member 45 when the cartridge is pierced. A shear pin 51 is transversely positioned through the lower end 50 of piston member 45 to normally correctly position the piston member in a desired location. However, when rod 20 is lifted and there is release of compressive force by spring 26, sufficient force is brought to bear against piston 45 and thus shear pin 51 thereby causing it to break. The illustrated firing pin 54, coaxially depending from end 50 pierces cartridge 16 when boss 32 forces piston member 45 downwardly, which in turn breaks shear pin 51 and likewise moves piston member 45 downwardly. The length of firing pin 54 must be greater than the depth of cartridge 16 so that an opening is cut in the lower surface of cartridge 16 thereby causing release of compressed gas through pipe 18, connected to cylinder end 58, and into release fittings 12 and 14. In this manner simple upward displacement of actuator rod 20 causes sufficient pressurization in pipe 18 for operating the release fittings. Although the present invention discusses end utilization devices in term of harness release fittings, it should be borne in mind that the present invention is applicable to other types of pneumatically driven actuation devices.

The following discussion will explain the operation of the present invention in terms of ballistic actuation. As sheen in the figure, there are two coaxial internally formed cylindrical sections 60 and 62 for receiving corresponding piston member ends 64 and 72 of a dumbbell-shaped piston member 70. The cylindrical section 60 has a larger diameter than that of 62 and so do the corresponding piston member ends 64 and 72. The piston member ends are each supplied with respective O-rings 66 and 74 for maintaining separate gas pressure states in corresponding cylindrical sections 60 and 62. A shear pin 68 is located through the piston member end 72 and positions the piston member 70 in a proper original position whereby inlet pipe 22 communicates with cylindrical section 60 while inlet pipe 24 communicates with cylindrical section 62. The piston member 70 is designed so that movement thereof will only occur when inlet pipes 22 and 24 are both pressurized. This means, in the case that conventional SEA WARS gas generators (not shown) are connected to the pipes, that both have become activated by the presence of ocean water. The requirement that both lines be pressurized lends an added degree of safety to the actuation mechanism of the present invention.

Ballistic actuation occurs when both inlet pipes 22 and 24 pressurize respective cylindrical sections 60 and 62. Due to the larger diameter of piston member end 64, the piston member 70 is thrust downwardly breaking shear pin 68. Recess 80 in cylindrical section 62 is sufficiently deep to receive the entire piston member end 72 therein. As a result the gas charge present in inlet pipe 24 is free to pass through intermediate cylinder section 78 and communicating passageway 82. Small through bores 84 are formed in the lower end 85 of piston member 45 so that the pressurization can exert downward force on piston member 45. The end result is the same as mechanical actuation, namely the downward thrusting of firing pin 54 to pierce cartridge 16 and pressurize pipe 18.

In summary, the present invention is capable of pressurizing supply pipe 18 by either manual mechanical or automatic ballistic actuation. When used in conjunction with a harness, either actuation will quickly release an aviator from parachute harness and lap belt by quickly actuating quick release harness connectors. A single actuation of the present invention releases an aviator from a parachute and lap belt rather than separate actuations presently employed. For emergency ditching egress, this is a vast improvement.

It should be understood that the invention is not limited to the exact details of construction shown and described herein for obvious modifications will occur to persons skilled in the art.

I claim:

1. A compressed gas cartridge ballistic actuator comprising:
   a piston having a firing pin attached thereto in normally separated relation to the cartridge;
   a double-ended piston shuttle having ends of different diameter interconnected by a narrowed connective section;
   a hollowed cylinder for receiving the shuttle, the cylinder having first and second ends receiving respective ends of the double-ended piston shuttle;
   first and second inlets communicating with respective cylinder ends for receiving compressed inlet gas charges;
   a passageway communicating between a central portion of the cylinder and the piston;
   means for normally retaining the shuttle in a neutral position blocking gas flow between the inlets and the piston;
   delivery of gas to an inlet associated with a larger shuttle end causing displacement of the shuttle to a position opening a path between the other inlet and the passageway, thus resulting in movement of the piston and completed movement of the firing pin which pierces the cartridge; and
   outlet means communicating with the cartridge for delivering a compressed gas charge from the cartridge to a utilization device.

2. The structure set forth in claim 1 together with means for mechanically actuating the firing pin comprising:
   a boss located in coaxial spaced relation to the piston; and
   means connected to the boss for thrusting the boss forcefully against the piston causing the firing pin to pierce the cartridge.

3. The structure set forth in claim 1 together with means for connecting the outlet to pneumatically releasable fittings thus causing their release upon piercing of the cartridge.

4. The structure set forth in claim 2 wherein the thrusting means comprises:
   a first actuating rod section coaxially secured to the boss;
   a spring located over the first rod section in contact with the boss;
   a second actuating rod section detachably connected to the first section, displacement of the rod sections compressing the spring to a point after which the first and second sections separate causing impulsive uncoiling of the spring and consequent displacement of the firing pin through the cartridge.

5. The structure set forth in claim 4 wherein the means located adjacent the boss comprises an intermediate piston having openings therein for directing pressure in the passageway to bear against the first-mentioned piston.

6. In a dual action actuating device for operating release fittings in an aviator's harness, the device being mechanically or ballistically actuated by a source of gas charge responsive to sea water, the ballistic actuator comprising:
   a single piston having a firing pin attached thereto in normally separated relation to a gas cartridge;

a double-ended piston shuttle having ends of different diameter interconnected by a narrowed connective section;

a hollowed cylinder for receiving the shuttle, the cylinder having first and second ends receiving respective ends of the double-ended piston;

first and second inlets communicating with respective cylinder ends for receiving compressed inlet gas charges from a source;

a passageway communicating between a central portion of the cylinder and the single piston;

means for normally retaining the shuttle in a neutral position blocking gas flow between the inlets and the single piston;

delivery of gas to an inlet associated with a larger shuttle end causing displacement of the shuttle to a position opening a path between the other inlet and the passageway, thus resulting in movement of the single piston and attached firing pin which pierces the cartridge; and outlet means communicating with the cartridge for delivering a compressed gas charge from the cartridge to a release fitting.

7. The structure set forth in claim 6 wherein the mechanical actuator comprises:

a boss located in coaxial spaced relation to the single piston; and means connected to the boss for thrusting the boss forcefully against the single piston causing the firing pin to pierce the cartridge.

8. The structure set forth in claim 7 wherein the thrusting means comprises:

a first actuating rod section coaxially secured to the boss;

a spring located over the first rod section, in contact with the boss;

a second actuating rod section detachably connected to the first section for compressing the spring to a point after which the first and second sections separate causing uncoiling of the spring and displacement of the firing pin through the cartridge.

9. The structure set forth in claim 5 together with an intermediate piston located between the boss and single piston, the intermediate piston having openings therein for directing pressure in the passageway to bear against the single piston.

* * * * *

UNITED STATES PATENT AND TRADEMARK OFFICE
CERTIFICATE OF CORRECTION

PATENT NO. : 5,036,660
DATED : August 6, 1991
INVENTOR(S) : Armand Aronne It is certified that error appears in the above-identified patent and that said Letters Patent is hereby corrected as shown below:

Title Page:
In the Abstract, line 1, change "pneutically" to --pneumatically--.

Column 1, lines 41-43, delete "of the type set forth in the previously mentioned co-pending applications".

Column 1, lines 63 and 64, delete "of the aforementioned co-pending patent application".

Column 2, lines 13-15, delete "but do form the subject matter of the previously identified co-pending related patent application--.

Column 3, line 20, change "sheen" to --seen--.

Signed and Sealed this

Third Day of November, 1992

*Attest:*

DOUGLAS B. COMER

*Attesting Officer*  *Acting Commissioner of Patents and Trademarks*